US012767180B2

(12) United States Patent
Boehm

(10) Patent No.: US 12,767,180 B2
(45) Date of Patent: Oct. 20, 2026

(54) DYNAMIC ASSIGNMENT OF ELECTRIC VEHICLE OPERATIONAL CHARACTERISTICS BASED ON VEHICLE SITE

(71) Applicant: Textron Inc., Providence, RI (US)

(72) Inventor: Christopher Alexander Boehm, North Augusta, SC (US)

(73) Assignee: Textron Inc., Providence, RI (US)

( * ) Notice: Subject to any disclaimer, the term of this patent is extended or adjusted under 35 U.S.C. 154(b) by 81 days.

(21) Appl. No.: 18/439,476

(22) Filed: Feb. 12, 2024

(65) Prior Publication Data

US 2025/0256738 A1 Aug. 14, 2025

(51) Int. Cl.
*B60W 60/00* (2020.01)
*B60L 15/20* (2006.01)

(52) U.S. Cl.
CPC ......... *B60W 60/0025* (2020.02); *B60L 15/20* (2013.01); *B60L 2240/62* (2013.01); *B60W 2556/50* (2020.02)

(58) Field of Classification Search
CPC ..... B60L 15/20; B60L 2240/62; B60W 15/00; B60W 50/0098; B60W 60/0025; B60W 2300/405; B60W 2556/45; B60W 2050/0075; B60W 2556/50
See application file for complete search history.

(56) References Cited

U.S. PATENT DOCUMENTS 4,910,677 A 3/1990 Remedio et al.
5,610,586 A * 3/1997 Zeytoonjian ........... A63B 55/61 340/988
5,685,786 A 11/1997 Dudley
5,772,534 A 6/1998 Dudley
6,236,940 B1 5/2001 Rudow et al.
6,348,007 B2 2/2002 Kawasaki et al.
6,885,998 B1 4/2005 Arduino
7,480,569 B2 1/2009 Wehrlen et al.
9,731,744 B2 * 8/2017 Carter ................. G01S 5/02685
10,046,641 B2 * 8/2018 Penmetsa ................ B60L 1/003
10,340,523 B2 * 7/2019 Jagannathan ......... H01M 4/625

(Continued)

FOREIGN PATENT DOCUMENTS

CN 219668371 U * 9/2023
DE 102020125470 A1 * 4/2021 .............. B60L 53/68

(Continued)

OTHER PUBLICATIONS

Pendleton, Scott, et al. “Autonomous golf cars for public trial of mobility-on-demand service.” 2015 IEEE/RSJ international conference on intelligent robots and systems (IROS). IEEE, (Year:2015).*

(Continued)

*Primary Examiner* — Cuong H Nguyen
(74) *Attorney, Agent, or Firm* — Akona IP PC

(57) ABSTRACT

A method of operating a vehicle, wherein the vehicle comprises an onboard controller, the method comprising automatically detecting operation of the vehicle within a site defined by a geographic boundary; and providing to the vehicle operational characteristics associated with the site, wherein the onboard controller causes the vehicle to operate in accordance with the operational characteristics while the vehicle remains within the site.

18 Claims, 5 Drawing Sheets

(56) References Cited

U.S. PATENT DOCUMENTS

| | | | | |
|---|---|---|---|---|
| 11,009,868 | B2 * | 5/2021 | Ferguson | G05D 1/0027 |
| 11,048,255 | B2 | 6/2021 | Lee et al. | |
| 11,067,983 | B2 * | 7/2021 | Kentley-Klay | G07C 5/00 |
| 11,156,999 | B2 | 10/2021 | Lee | |
| 11,366,470 | B2 * | 6/2022 | Panigrahi | B60L 53/64 |
| 11,447,269 | B2 * | 9/2022 | Seeley | B60L 53/80 |
| 11,707,657 | B2 | 7/2023 | Hsu | |
| 12,094,343 | B2 * | 9/2024 | Boehm | H04W 4/80 |
| 2002/0082122 | A1 | 6/2002 | Pippin et al. | |
| 2007/0016438 | A1 | 1/2007 | Bain | |
| 2007/0099715 | A1 | 5/2007 | Jones et al. | |
| 2008/0120157 | A1 | 5/2008 | Foster | |
| 2009/0082139 | A1 | 3/2009 | Hart | |
| 2015/0083508 | A1 * | 3/2015 | Bluethmann | B62D 5/0418 180/204 |
| 2017/0151890 | A1 | 6/2017 | Jager et al. | |
| 2018/0356821 | A1 * | 12/2018 | Kentley-Klay | G05D 1/0287 |
| 2019/0025819 | A1 * | 1/2019 | Ferguson | G05D 1/0088 |
| 2019/0102823 | A1 | 4/2019 | Norman et al. | |
| 2021/0104160 | A1 * | 4/2021 | Gao | G06Q 10/02 |
| 2021/0356959 | A1 * | 11/2021 | Ferguson | G08G 1/164 |
| 2022/0299593 | A1 * | 9/2022 | Abir | G01S 11/04 |
| 2023/0036188 | A1 * | 2/2023 | Schmidt | G06Q 20/3278 |
| 2023/0040437 | A1 * | 2/2023 | Boehm | G08G 1/205 |
| 2023/0043086 | A1 * | 2/2023 | Starns | G07C 5/0808 |
| 2023/0119659 | A1 * | 4/2023 | Foster | B60W 60/0011 701/24 |
| 2023/0406292 | A1 * | 12/2023 | Fasola | B60W 30/08 |
| 2024/0300473 | A1 * | 9/2024 | Light-Holets | B60W 20/13 |

FOREIGN PATENT DOCUMENTS

| | | | | |
|---|---|---|---|---|
| EP | 3371795 | B1 * | 7/2023 | G05D 1/6445 |
| JP | H06343732 | A | 12/1994 | |
| JP | H0716326 | A | 1/1995 | |
| JP | H0751417 | A | 2/1995 | |
| JP | H0769741 | A | 3/1995 | |
| JP | 3018577 | U | 11/1995 | |
| JP | H0966129 | A | 3/1997 | |
| JP | H114926 | A | 1/1999 | |
| JP | H114928 | A | 1/1999 | |
| JP | 2002085611 | A | 3/2002 | |
| JP | 3288935 | B2 | 6/2002 | |
| JP | 2002288380 | A | 10/2002 | |
| JP | 2004236961 | A | 8/2004 | |
| JP | 2004329705 | A | 11/2004 | |
| JP | 2006212223 | A | 8/2006 | |
| JP | 2008178677 | A | 8/2008 | |
| JP | 2009015800 | A | 1/2009 | |
| JP | 5977484 | B2 | 8/2016 | |
| JP | 2020501632 | A | 1/2020 | |
| KR | 20040012289 | A | 2/2004 | |
| KR | 200372425 | Y1 | 1/2005 | |
| KR | 100902943 | B1 | 6/2009 | |
| KR | 100911806 | B1 | 8/2009 | |
| KR | 100974405 | B1 | 8/2010 | |
| KR | 20110016197 | A | 2/2011 | |
| KR | 101066249 | B1 | 9/2011 | |
| KR | 101132129 | B1 | 4/2012 | |
| KR | 20160141485 | A | 12/2016 | |
| KR | 20180007360 | A | 1/2018 | |
| KR | 102053533 | B1 | 12/2019 | |
| KR | 102172331 | B1 | 10/2020 | |
| KR | 102356477 | B1 | 1/2022 | |
| KR | 20220013749 | A | 2/2022 | |
| WO | WO-2019088989 | A1 * | 5/2019 | B60W 60/0011 |
| WO | 2023021355 | A1 | 2/2023 | |

OTHER PUBLICATIONS

Pham, Minh-Quan, et al. "Transform an electric golf cart into an autonomous vehicle." 2022 International Conference on Multimedia Analysis and Pattern Recognition (MAPR). IEEE, (Year:2022).*

Tremura, Heitor, and Onur Toker. "Vehicle level software design of the florida polytechnic autonomous golf-cart." SoutheastCon 2021. IEEE, (Year: 2021).*

Yan, Caihong, et al. "A hybrid power source and its control strategy optimization for low-speed electric vehicle." Proceedings of the Institution of Mechanical Engineers, Part D: Journal of Automobile Engineering (2025): 09544070251389156. (Year: 2025).*

Long S, Wu B, Cui L, Zhang W, Li Y, Hu W. Design and research of energy recovery devices for new energy vehicles. InJournal of Physics: Conference Series Aug. 1, 2024 (vol. 2823, No. 1, p. 012061). IOP Publishing. (Year: 2024).*

H. Tremura and O. Toker, "Vehicle Level Software Design of the Florida Polytechnic Autonomous Golf-Cart," SoutheastCon 2021, Atlanta, GA, USA, 2021, pp. 1-4, doi: 10.1109/SoutheastCon45413.2021.9401891 (Year: 2021).*

* cited by examiner

DYNAMIC ASSIGNMENT OF ELECTRIC VEHICLE OPERATIONAL CHARACTERISTICS BASED ON VEHICLE SITE

TECHNICAL FIELD

This disclosure relates in general to the field of fleet management of lightweight utility vehicles, such as golf carts and, more particularly, though not exclusively, to a system for controlling the speed and other operational characteristics of such vehicles based on the respective sites in which the vehicles are located.

BACKGROUND

Lightweight electric utility vehicles (LEUVs), such as golf carts, are increasingly becoming a popular mode of transportation for both golfers on golf courses as well as for residents of certain communities, particularly gated communities. LEUVs are quiet and eco-friendly, making them a desirable alternative to gas-powered vehicles.

BRIEF DESCRIPTION OF THE DRAWINGS

To provide a more complete understanding of the present disclosure and features and advantages thereof, reference is made to the following description, taken in conjunction with the accompanying figures, in which like reference numerals represent like elements.

DETAILED DESCRIPTION

Figure 1:
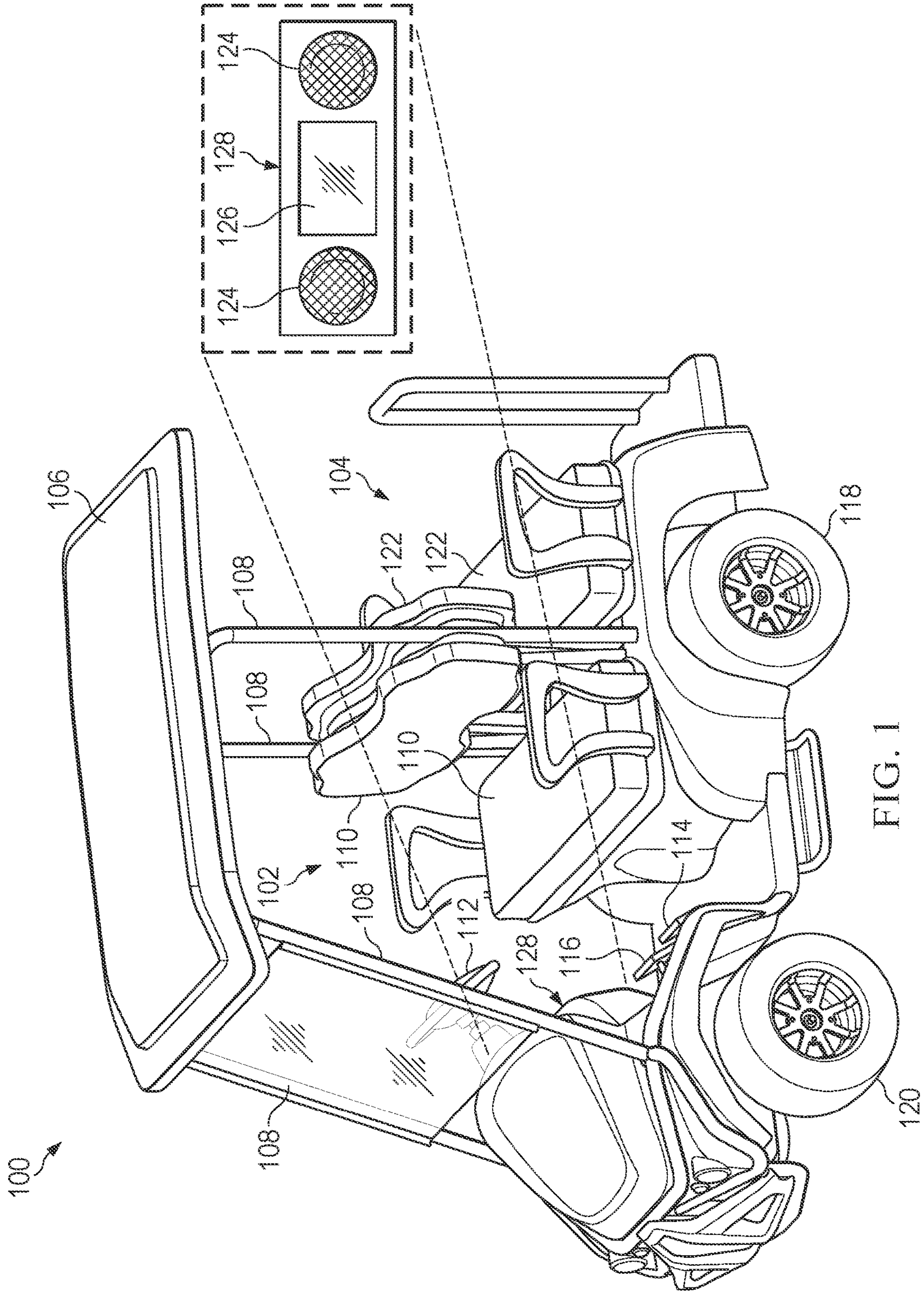
FIG. 1 illustrates an example LEUV in connection with which embodiments described herein for an electric vehicle site-based speed control system may be implemented.

The following disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. It will of course be appreciated that in the development of any actual embodiment, numerous implementation-specific decisions must be made to achieve the developer's specific goals, including compliance with system, business, and/or legal constraints, which may vary from one implementation to another. Moreover, it will be appreciated that, while such a development effort might be complex and time-consuming;

it would nevertheless be a routine undertaking for those of ordinary skill in the art having the benefit of this disclosure.

In the specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above", "below", "upper", "lower", "top", "bottom", "raised", "lowered", or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction. When used to describe a range of dimensions or other characteristics (e.g., time, pressure, temperature, length, width, etc.) of an element, operations, and/or conditions, the phrase "between X and Y" represents a range that includes X and Y.

Additionally, as referred to herein in this specification, the terms "forward," "aft," "inboard," and "outboard" may be used to describe relative relationship(s) between components and/or spatial orientation of aspect(s) of a component or components. The term "forward" may refer to a spatial direction that is closer to a front of a vehicle relative to another component or component aspect(s). The term "aft" may refer to a spatial direction that is closer to a rear of a vehicle relative to another component or component aspect(s). The term "inboard" may refer to a location of a component that is within the fuselage of a vehicle and/or a spatial direction that is closer to or along a centerline of the vehicle (wherein the centerline runs between the front and the rear of the vehicle) or other point of reference relative to another component or component aspect. The term "outboard" may refer to a location of a component that is outside the fuselage of a vehicle and/or a spatial direction that is farther from the centerline of the vehicle or other point of reference relative to another component or component aspect.

Further, the present disclosure may repeat reference numerals and/or letters in the various examples. This repetition is for the purpose of simplicity and clarity and does not in itself dictate a relationship between the various embodiments and/or configurations discussed. Example embodiments that may be used to implement the features and functionality of this disclosure will now be described with more particular reference to the accompanying figures.

FIG. 1 illustrates a vehicle 100 in connection with which embodiments described herein for an electric vehicle location-based speed control system may be implemented. In particular embodiments, vehicle 100 may be an LEUV. As shown in FIG. 1, vehicle 100 is generally an open cabin vehicle, such as a golf cart, a utility vehicle, a maintenance vehicle, a cargo vehicle, a shuttle vehicle, a personal transportation vehicle, etc., that includes a main passenger seating area 102, an auxiliary passenger seating area 104 disposed behind the main passenger seating area 102, and a canopy 106 primarily disposed over the main passenger seating area 102. Canopy 106 may be mounted to vehicle 100 and supported over (or above) main passenger seating area 102 via support struts 108. In particular embodiments support struts 108 may provide a rollover protection system (ROPS) for the vehicle 100.

The main passenger seating area 102 generally includes a primary seating structure 110, a steering wheel 112 for use by an operator (or driver) of the vehicle 100 to control the directional movement of the vehicle, a brake pedal 114 for use by the vehicle operator to control slowing and stopping of the vehicle, and an accelerator pedal 116 for use by the vehicle operator to control the torque delivered by one or more vehicle prime movers (not shown) to one or more rear wheels 118 and one or more front wheels 120. Auxiliary passenger seating area 104 generally includes an auxiliary seating structure 122 that can be attached to the rear portion of vehicle 100 behind primary seating structure 110 to provide additional seating capacity for the vehicle. More particularly, auxiliary seating structure 122 provides seating capacity in addition to that provided by the primary seating structure 110. Primary seating structure 110 is generally structured and operable to accommodate a vehicle operator and at least one passenger in a forward-facing (i.e., toward the front of vehicle 100) position, while auxiliary seating structure 122 is generally structured and operable to accommodate at least two passengers in a rearward-facing (i.e., toward the rear of vehicle 100) position. In particular embodiments, vehicle 100 includes one or more speakers 124 and a display 126, all of which may be provided on a dashboard 128 of vehicle 100. One or more controls associated with speakers 124 and display 126 may also be provided on or near dashboard 128.

In accordance with features of embodiments described herein, an intelligent fleet management system may be deployed to manage various operational aspects of a fleet of vehicles, such as vehicle 100, to increase vehicle and passenger safety, for example. One manner in which such an intelligent fleet management system may increase safety is by controlling the speed of the vehicles managed by the system. A fleet management system may be associated with a defined geographic area, such as a golf course or residential community, referred to herein as a "site." In such cases, a governing body associated with the site may adopt specifications and/or regulations dictating configuration settings, including operational restrictions, of vehicles operating within the site controlled by the governing body. Such configuration settings (alternatively referred to herein as operational characteristics or operational attributes) may include, but are not limited to, maximum vehicle speed, maximum vehicle acceleration, vehicle battery charge/discharge characteristics, inertial measurement unit (IMU) characteristics and restrictions, telemetry data, maximum charge status, motor controller software versions, smart regeneration characteristics, etc. Although embodiments herein will be described primarily with reference to maximum vehicle speed configuration settings, it will be recognized that features of embodiments are equally applicable to other configuration settings, including but not limited to those previously listed.

Historically, when a vehicle is delivered to a site, it must be manually configured for operation within the site. In contrast, in accordance with features of embodiments described herein, configuration settings may be automatically applied to a vehicle-based on a site ID associated with the site in which the vehicle is to operate. In a related feature, movement of a vehicle from one site to another may result in its configuration settings being automatically updated based on the new site ID. Site-specific configuration may be desirable for many reasons. For example, the topography and/or climate of sites may differ widely (e.g., hilly vs. flat, bumpy vs. smooth, hot vs. cold, etc.) in ways that impact various aspects of the operation of vehicles operating within the boundaries of the site. For example, if a site is predominantly hilly, it may be desirable to impose an operational attribute that restricts the maximum power/charge status of a vehicle to avoid overheating coils. Additionally, there may be regulations that apply to certain sites that do not apply to other sites based on the relative locations of the sites (e.g., certain countries may have particular privacy requirements that may restrict how telemetry may be used, whereas other countries may not have those restrictions). Still further, the governing body of one site may desire that vehicles operating within the site stay within predefined operational limits (e.g., speed, IMU restrictions, etc.), whereas the governing body of another site may have different (more stringent or more relaxed) requirements.

Example operational characteristics or attributes that may be specified in accordance with features of embodiments described herein include but are not limited to those related to battery characteristics, charge characteristics, smart regen characteristics, motor control software version, IMU characteristics, and regulatory issues. In additional aspects of particular embodiments, operational characteristics/attributes may include identifying an individual or individuals who are authorized to operate a vehicles or vehicles within the site, either by specifying a default list of authorized operators by ID or title and/or enabling a valet mode that may be initiated under particular circumstances to allow any operator to operate a vehicle for a particular distance or amount of time, for example. In some embodiments, moving the vehicle from one site to another results in automatic updating of the operational characteristics/attributes of the vehicle from those associated with the first site to those associated with the second.

Figure 2A:
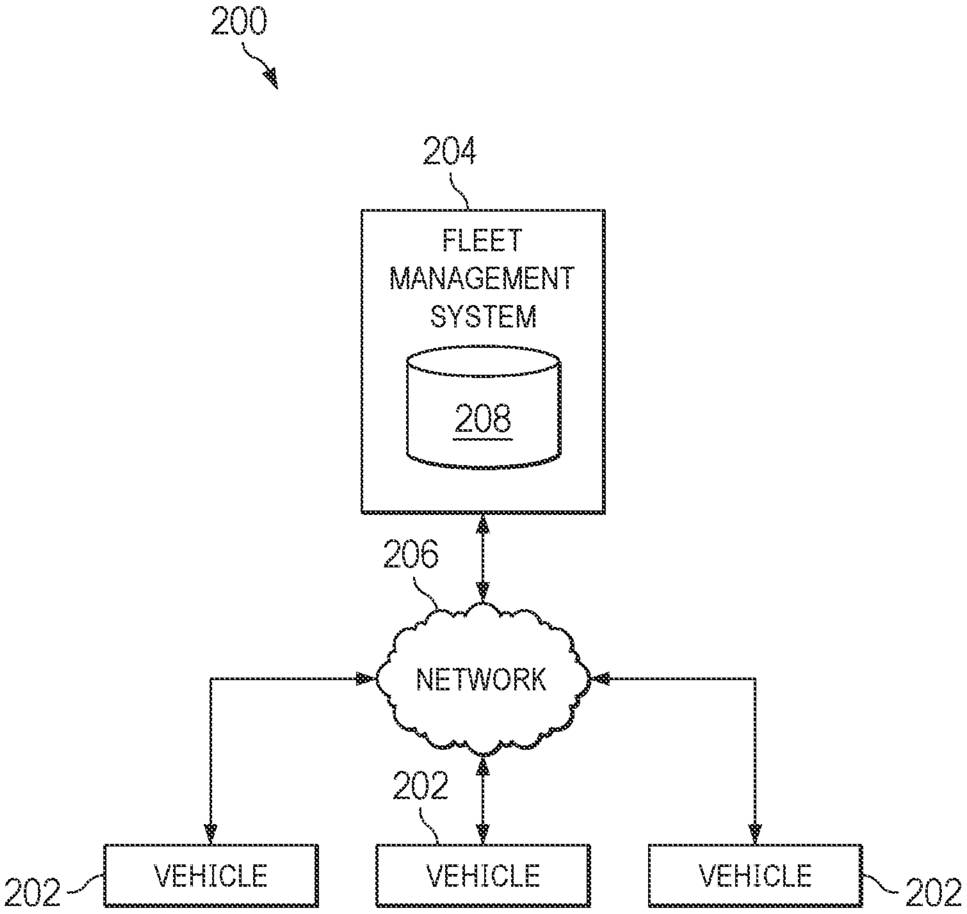
FIG. 2A illustrates a simplified block diagram of an example site in which electric vehicle site-based assignment of operational characteristics according to features of embodiments described herein may be implemented.

FIG. 2A illustrates a simplified block diagram of a site 200 according to some embodiments of the present disclosure. In accordance with features of embodiments described herein, site 200 includes a plurality of vehicles 202, each of which may be substantially similar, if not completely identical, to vehicle 100 (FIG. 1). Site 200 further includes a fleet management system 204 in communication with vehicles 202 through a network 206. In various embodiments, network 206 may be a public or private network or may comprise a combination of public and/or private networks. In other embodiments, site 200 may include fewer, more, or different components. For instance, site 200 may include a different number of vehicles 202. Alternatively, fleet management system 204 may be associated with multiple sites, such as site 200. A single vehicle may be referred to herein as vehicle 202. Multiple vehicles may be referred to collectively as vehicles 202.

Vehicle 202 may include one or more onboard sensors that detect various aspects of the environment in which vehicle 202 is operating and generate sensor data indicative of same. In some embodiments, onboard sensors may include one or more of global positioning system (GPS), wheel speed sensors, IMUs, accelerometers, microphones, strain gauges, pressure monitors, barometers, thermometers, altimeters, and ambient light sensors, for example. The sensors may be positioned in various locations on vehicle 202.

Vehicle 202 may also include an onboard controller. The onboard controller controls operations and functionality of vehicle 202. In some embodiments, the onboard controller may be a general-purpose computer or some portion thereof, but may additionally or alternatively be any suitable computing device. The onboard controller may be adapted for I/O communication with other components of vehicle 202, such as sensors, and with external systems, such as fleet management system 204. The onboard controller may be connected to the Internet (e.g., network 206) via a wireless connection (e.g., via a cellular data connection). Additionally or alternatively, the onboard controller may be coupled to any number of wireless or wired communication systems comprising network 206. The onboard controller may process sensor data generated by the onboard sensors and/or other data (e.g., data received from fleet management system 204) to determine a state of vehicle 202. Onboard controller may be coupled to other components of vehicle 202, such as onboard sensors, via a controller area network (CAN) bus.

Vehicle 202 may include a rechargeable battery for powering the vehicle. The rechargeable battery may be a lithium-ion battery, a lithium polymer battery, a lead-acid battery, a nickel-metal hydride battery, a sodium nickel chloride ("zebra") battery, a lithium-titanate battery, or another type of rechargeable battery suitable for powering vehicle 202. In some embodiments, vehicle 202 may be a hybrid electric vehicle that may also include an internal combustion engine for powering the vehicle when the battery is in a low charge state, for example. In some embodiments, vehicle 202 may include multiple batteries, in which case one battery may be used to power vehicle propulsion another may be used to power vehicle hardware (e.g., onboard sensors and/or onboard controller 117). Vehicle 202 may further include components for charging the battery, including for example a charge port configured to make an electrical connection between the battery and a charging station.

The fleet management system 204 may support operation and management of vehicles 202. In some embodiments, the fleet management system 204 may also provide vehicle 202 with system backend functions and may include one or more switches, servers, and/or automated response systems (which responses may be provided via vehicle speakers and/or display). Fleet management system 204 may also include one or more databases, represented in FIG. 2A by a database 208. Any or all of the aforementioned components of the fleet management system 204 may be coupled to one another via a wired or wireless local area network (LAN). The fleet management system 204 may receive and transmit data via one or more appropriate devices and network from and to the vehicle 202, such as by wireless systems, such as 882.11x, GPRS, and the like. Database 208 can store configuration information for each of vehicles 202, such as configuration attributes based on a site ID of site 200 (also referred to herein as site-specific operational attributes) and/or, in some embodiments, configuration attributes based on a vehicle ID or type of vehicle 202 (also referred to herein as vehicle-specific operational attributes). Some of configuration information stored in database 208 for vehicle 202 may be specific to the individual vehicle while other configuration information stored in database 208 may be general to all vehicles 202 of the fleet.

Database 208 may also store a site map and/or information about site features, which may be in the form of sets of GPS coordinates. For example, if site is a golf course, fleet management system 204 site features stored in database 208 may include greens, pins, holes, fairways, obstacles (e.g., sand traps, water features, etc.). Fleet management system 204 may communicate with vehicle 202 to provide route guidance or location information in response to a request received from the vehicle.

A geofence may be considered a virtual perimeter for a real-world geographic area. A geofence can be dynamically generated (e.g., a radius around a point location) or match a predefined set of boundaries (e.g., golf course fairway boundaries). The use of a geofence is commonly referred to as geofencing. Presently, fleet management systems for lightweight utility vehicles, such as golf carts, allow for geofences to be defined by a human operator (e.g., a manager) of a site (e.g., a golf course) on which a fleet of vehicles operates. Limitations on operations permitted to be performed by fleet vehicles within a particular geofenced area may be determined by the operator based on his or her experience, as well as his or her familiarity with the geography and topography of the site. Such operational limitations may include limiting the speed of a vehicle, disabling forward motion of a vehicle, disabling any motion of a vehicle, providing audible alerts using a speaker of the vehicle, and providing text, graphics, and/or video messages on a vehicle display.

Network 206 can support communications between vehicles 202 and fleet management system 204. Network 206 may comprise any combination of local area and/or wide area networks, using both wired and/or wireless communication systems. In one embodiment, network 206 may use standard communications technologies and/or protocols. For example, the network 206 may include communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via network 206 may include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 130 may be represented using any suitable format, such as hypertext markup language (HTML) or extensible markup language (XML). In some embodiments, all or some of the communication links of network 206 may be encrypted using any suitable technique or techniques.

Figure 2B:
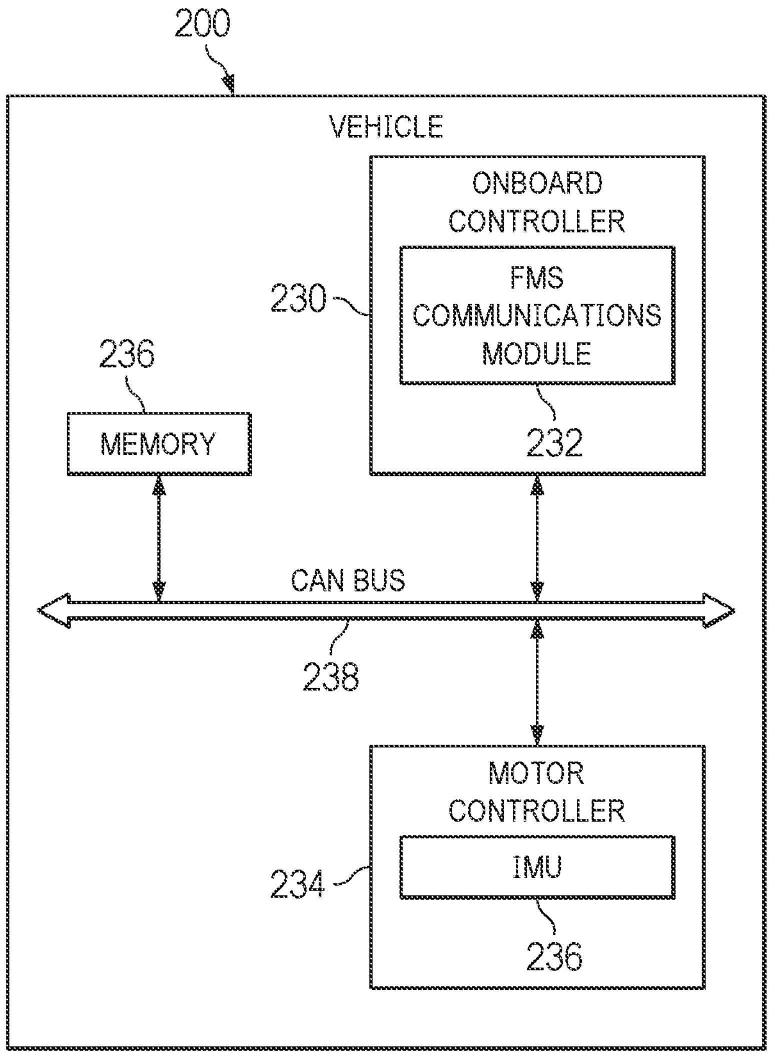
FIG. 2B illustrates a simplified block diagram of an example vehicle in which electric vehicle site-based assignment of operational characteristics according to features of embodiments described herein may be implemented.

FIG. 2B illustrates a more detailed system block diagram of vehicle 202. As shown in FIG. 2B, and as described above, vehicle 202 includes an onboard controller 230 including a communications module 232 for communicating with fleet management system 204 (FIG. 2A) via network 206 (FIG. 2A). A motor controller 234 for controlling motive operation of vehicle 202 includes an IMU 236 and is connected to onboard controller 230 via a vehicle data network 238, which may be implemented as a CAN bus. In particular embodiments, motor controller 234 includes wheel speed sensors and other sensors for sensing various operational aspects of vehicle and providing data indicative of same to fleet management system 204 (FIG. 2A). In alternative embodiments, IMU 236 could be deployed externally to controller 234. For example, IMU 236 could be deployed internally to onboard controller 230 or another module of vehicle 202 or as a standalone module.

It will be recognized that IMU 236 may be implemented as an electronic sensing device that measures and reports the specific force, angular rate and/or orientation of a body on which it is installed. In particular embodiments, an IMU detects linear acceleration of the body using one or more accelerometers and rotational rate of the body using one or more gyroscopes. An IMU may also include one or more magnetometers for use as a heading reference. In a typical configuration, an IMU may include one accelerometer, one gyroscope, and one magnetometer per axis for each of three principal axes (e.g., pitch, roll, yaw (or x, y, z)). As used herein, IMU refers to any combination of accelerometers, gyroscopes and/or magnetometers that together perform the aforementioned purposes of an IMU. Integration of an IMU with a GPS and other sensors, such as a wheel speed sensor, provides the ability to gather data about the vehicle's current speed, turn rate, heading, inclination and acceleration, which data may collectively be referred to herein as "vehicle motion data."

IMU 212 is capable of measuring acceleration in all three coordinate directions (pitch, roll, yaw or x, y, z) and angular speed about all three coordinates. The IMU data is combined with vehicle velocity data (e.g., provided by one or more sensors of motor controller 234) and providing resultant motion data to fleet management system 204 via communications module 232, enabling a variety of conditions of vehicle 202 to be determined and monitored by fleet management system 204. Additionally, global positioning system (GPS) capabilities of onboard controller 230 enable IMU motion data to be correlated to a GPS location, which location information is also provided to fleet management system 204.

One or more memory or storage devices 240 may be provided for purposes to be described in greater detail hereinbelow. In FIG. 2B, memory 240 is shown as being connected to CAN bus 238; however, in alternative embodiments, memory may be directly connected to onboard controller 230.

Figure 3:
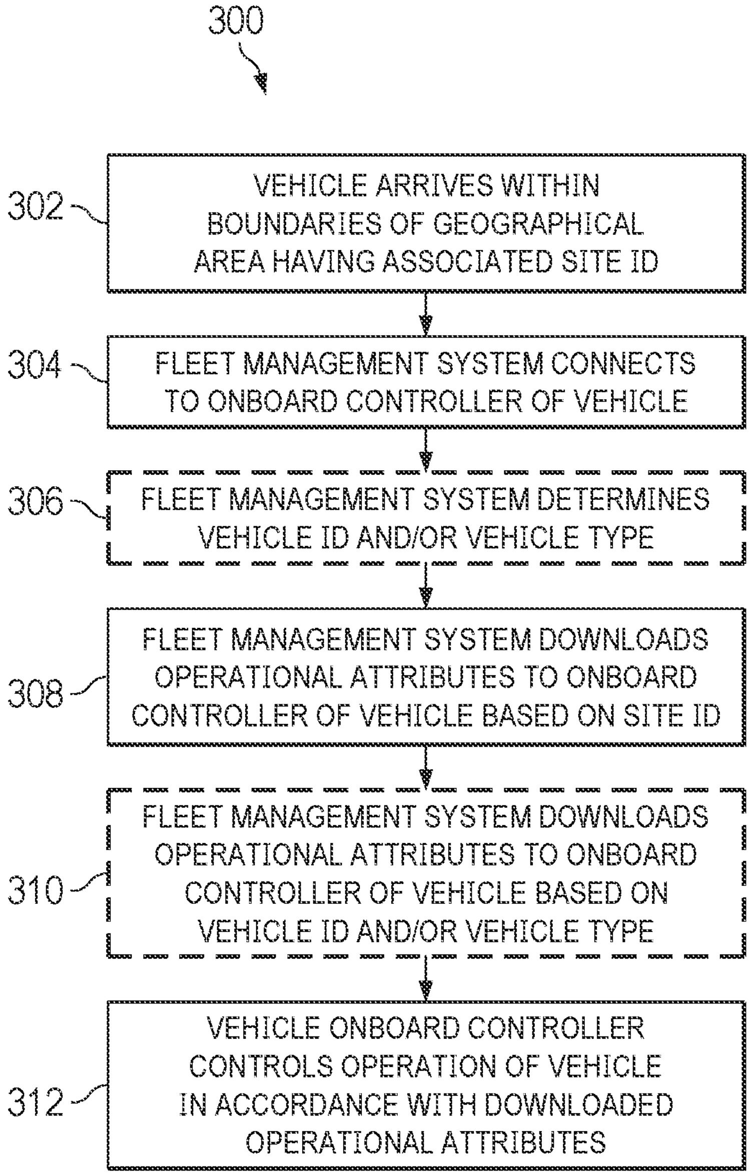
FIG. 3 is a flowchart illustrating example operations that may be performed by an electric vehicle site-based assignment of operational characteristics according to features of embodiments described herein.

FIG. 3 is a flowchart 300 illustrating example operations performed by a system for implementing a braking assist feature in an electric vehicle, such as vehicle 202, according to features of embodiments described herein. In certain embodiments, one or more of the operations illustrated in FIG. 3 may be executed by one or more of the elements shown in FIGS. 2A and 2B, for example.

In operation 302, a vehicle, such as vehicle 202 (FIG. 2A), arrives within a geographical area (e.g., site 200 (FIG. 2A)) having an associated site ID. Detection by fleet management system of a vehicle within the boundaries of the site may be performed in any number of known manners.

In operation 304, the fleet management system of the site (e.g., fleet management system 204 (FIG. 2A)) connects to the onboard controller (e.g., controller 230) of the vehicle. It will be recognized that in particular implementations, operations 302 and 304 may be performed as a single operation or simultaneous operations.

In optional operation 306, the fleet management system determines the vehicle ID and/or vehicle type of the vehicle. Operation 306 allows fleet management system to uniquely identify the vehicle within the system for purposes described in greater detail below.

In operation 308, the fleet management system download operational attributes associated with the site (e.g., based on the site ID) to the onboard controller of the vehicle.

In optional operation 310, the fleet management system further downloads operational attributes associated with the vehicle ID and/or vehicle type to the onboard controller of the vehicle.

In operation 312, the onboard controller of the vehicle controls the operation of the vehicle In accordance and compliance with the operational attributes downloaded in operations 306 and/or 310.

It will be recognized that events other than/in addition to detection of a vehicle within the boundaries of a site may trigger performance of operations shown in FIG. 3. For example, the operations may be performed according to a predefined schedule (e.g., once a day, once a week, once a month), in response to a manual reset implemented at the fleet management system, and/or in response to one or more of the site-specific or vehicle-specific operational attributes being updated at the fleet management system.

It will be recognized that site-based and vehicle-based attributes to be implemented at vehicles may be modified at the "back end" (i.e., at fleet management system). In some embodiments, such modification may be performed manually by a fleet management system operator, with the updates to the vehicles being effected as described above with reference to FIG. 3. In alternative embodiments, the modification may be performed automatically, such as by an algorithm implemented in software (e.g., by the fleet management system) in response to feedback and/or other relevant data. In still other embodiments, the modification may be performed automatically using artificial intelligence (AI), such as a neural network or machine learning model trained to optimize the operational characteristic for the particular site, such that a predictive element may be introduced.

Although the operations of the example method shown in and described with reference to FIG. 3 are illustrated as occurring once each and in a particular order, it will be recognized that the operations may be performed in any suitable order and repeated as desired. Additionally, one or more operations may be performed in parallel or simultaneously. Furthermore, the operations illustrated in FIG. 3 may be combined or may include more or fewer details than described.

Additionally, although embodiments have been described herein primarily with specific reference to electric golf carts, it will be recognized that the various features and aspects described may be advantageously applied in connection with other types of electric utility or other vehicles, including but not limited to turf vehicles and ground support equipment (GSE) vehicles.

Figure 4:
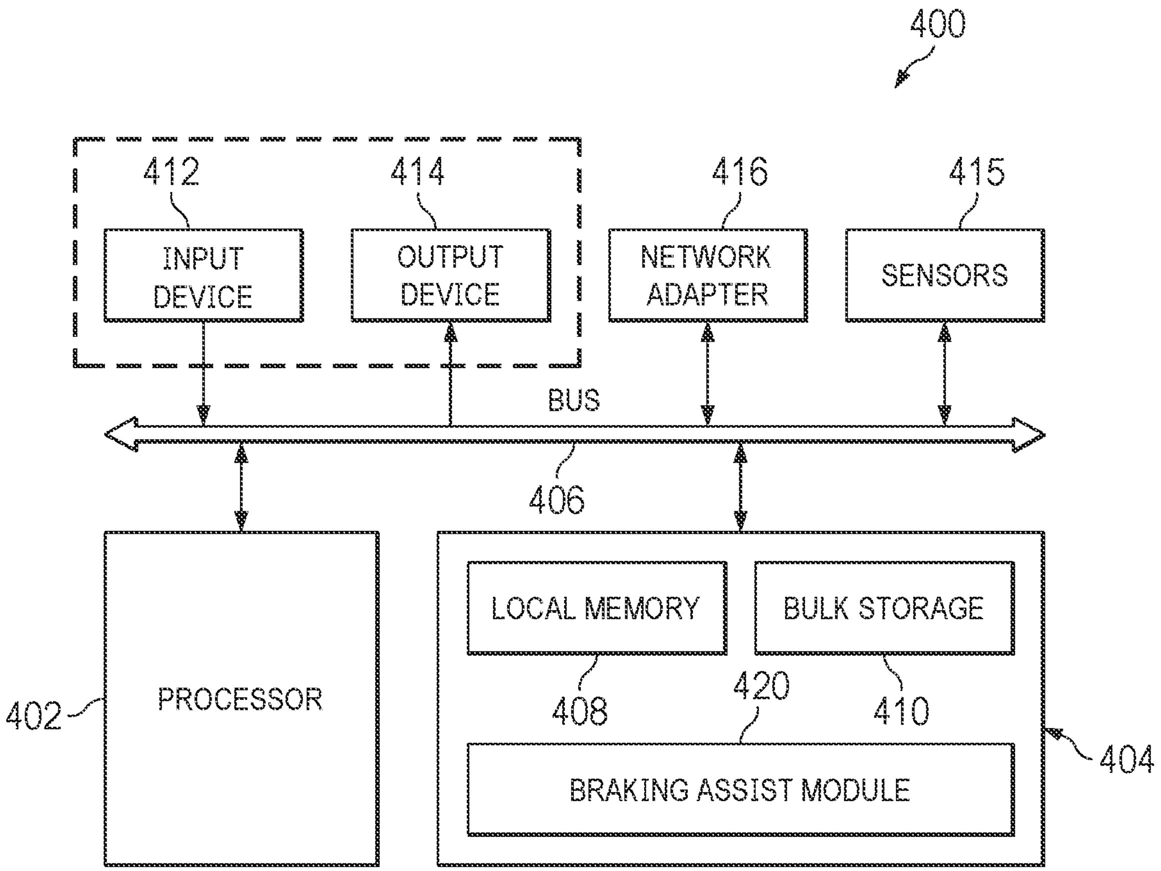
FIG. 4 is a block diagram of an example computer system that may be used to implement all or some portion of a system for electric vehicle site-based assignment of operational characteristics according to features of embodiments described herein.

FIG. 4 is a block diagram illustrating an example system 400 that may be configured to implement at least portions of techniques in accordance with embodiments described herein, and more particularly as shown in the FIGURES described hereinabove. For example, one or more elements of system 400 may be employed to implement portions of fleet management system 204, onboard controller 230, and/or motor controller 234 (FIGS. 2A and 2B). As shown in FIG. 4, the system 400 may include at least one processor 402, e.g., a hardware processor 402, coupled to memory elements 404 through a system bus 406. As such, the system may store program code and/or data within memory elements 404. Further, the processor 402 may execute the program code accessed from the memory elements 404 via a system bus 406. In one aspect, the system may be implemented as a computer that is suitable for storing and/or executing program code. It should be appreciated, however, that the system 400 may be implemented in the form of any system including a processor and a memory that is capable of performing the functions described in this disclosure.

In some embodiments, the processor 402 can execute software or an algorithm to perform the activities as discussed in this specification; in particular, activities related to embodiments described herein. The processor 402 may include any combination of hardware, software, or firmware providing programmable logic, including by way of non-limiting example a microprocessor, a digital signal processor (DSP), a field-programmable gate array (FPGA), a programmable logic array (PLA), an integrated circuit (IC), an application specific IC (ASIC), or a virtual machine processor. The processor 402 may be communicatively coupled to the memory element 404, for example in a direct-memory access (DMA) configuration, so that the processor 402 may read from or write to the memory elements 404.

In general, the memory elements 404 may include any suitable volatile or non-volatile memory technology, including double data rate (DDR) random access memory (RAM), synchronous RAM (SRAM), dynamic RAM (DRAM), flash, read-only memory (ROM), optical media, virtual memory regions, magnetic or tape memory, or any other suitable technology. Unless specified otherwise, any of the memory elements discussed herein should be construed as being encompassed within the broad term "memory." The information being measured, processed, tracked or sent to or from any of the components of the system 400 could be provided in any database, register, control list, cache, or storage structure, all of which can be referenced at any suitable timeframe. Any such storage options may be included within the broad term "memory" as used herein. Similarly, any of the potential processing elements, modules, and machines described herein should be construed as being encompassed within the broad term "processor." Each of the elements shown in the present figures may also include suitable interfaces for receiving, transmitting, and/or otherwise communicating data or information in a network environment so that they can communicate with, for example, a system having hardware similar or identical to another one of these elements.

In certain example implementations, mechanisms for implementing embodiments as outlined herein may be implemented by logic encoded in one or more tangible media, which may be inclusive of non-transitory media, e.g., embedded logic provided in an ASIC, in DSP instructions, software (potentially inclusive of object code and source code) to be executed by a processor, or other similar machine, etc. In some of these instances, memory elements, such as e.g., the memory elements 404 shown in FIG. 4 can store data or information used for the operations described herein. This includes the memory elements being able to store software, logic, code, or processor instructions that are executed to carry out the activities described herein. A processor can execute any type of instructions associated with the data or information to achieve the operations detailed herein. In one example, the processors, such as e.g., the processor 402 shown in FIG. 4, could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., an FPGA, a DSP, an erasable programmable read-only memory (EPROM), an electrically erasable programmable read-only memory (EEPROM)) or an ASIC that includes digital logic, software, code, electronic instructions, or any suitable combination thereof.

The memory elements 404 may include one or more physical memory devices such as, for example, local memory 408 and one or more bulk storage devices 140. The local memory may refer to RAM or other non-persistent memory device(s) generally used during actual execution of the program code. A bulk storage device may be implemented as a hard drive or other persistent data storage device. The processing system 400 may also include one or more cache memories (not shown) that provide temporary storage of at least some program code in order to reduce the number of times program code must be retrieved from the bulk storage device 140 during execution.

As shown in FIG. 4, the memory elements 404 may store a braking assist module 420. In various embodiments, the module 420 may be stored in the local memory 408, the one or more bulk storage devices 140, or apart from the local memory and the bulk storage devices. It should be appreciated that the system 400 may further execute an operating system (not shown in FIG. 4) that can facilitate execution of the module 420. The module 420, being implemented in the form of executable program code and/or data, can be read from, written to, and/or executed by the system 400, e.g., by the processor 402. Responsive to reading from, writing to, and/or executing the module 420, the system 400 may be configured to perform one or more operations or method steps described herein (e.g., in FIG. 3).

Input/output (I/O) devices depicted as an input device 412 and an output device 414, optionally, may be coupled to the system. Examples of input devices may include, but are not limited to, a keyboard, a pointing device such as a mouse, or the like. Examples of output devices may include, but are not limited to, a monitor or a display, speakers, or the like. In some implementations, the system may include a device driver (not shown) for the output device 414. Input and/or output devices 412, 414 may be coupled to the system 400 either directly or through intervening I/O controllers. Additionally, sensors 415 may be coupled to the system 400 either directly or through intervening controllers and/or drivers.

In an embodiment, the input and the output devices may be implemented as a combined input/output device (illustrated in FIG. 4 with a dashed line surrounding the input device 412 and the output device 414). An example of such a combined device is a touch sensitive display, also sometimes referred to as a "touch screen display" or simply "touch screen." In such an embodiment, input to the device may be provided by a movement of a physical object, such as, e.g., a stylus or a finger of a user, on or near the touch screen display.

A network adapter 416 may also, optionally, be coupled to the system 400 to enable it to become coupled to other systems, computer systems, remote network devices, and/or remote storage devices through intervening private or public networks. The network adapter may comprise a data receiver for receiving data that is transmitted by said systems, devices and/or networks to the system 400, and a data transmitter for transmitting data from the system 400 to said systems, devices and/or networks. Modems, cable modems, and Ethernet cards are examples of different types of network adapter that may be used with the system 400.

Example 1 provides a method of operating a vehicle, in which the vehicle includes an onboard controller, the method including automatically detecting operation of the vehicle within a site defined by a geographic boundary; providing to the vehicle operational characteristics associated with the site; in which the onboard controller causes the vehicle to operate in accordance with the operational characteristics while the vehicle remains within the site.

Example 2 provides the method of example 1, in which the vehicle is an electrical vehicle.

Example 3 provides the method of example 1 or 2, further including automatically detecting at least one of an identity of the vehicle and a type of the vehicle; and providing to the vehicle operational characteristics associated with the at least one of the identity of the vehicle and the type of the vehicle.

Example 4 provides the method of any one of examples 1-3, further including updating the vehicle operational characteristics associated with the site; and providing the updated vehicle operational characteristics associated with the site to the vehicle.

Example 5 provides the method of example 4, in which the onboard controller ceases causing the vehicle to operate in accordance with the operational characteristics while the vehicle remains within the site and causes the vehicle to operate in accordance with the updated operational characteristics while the vehicle remains within the site.

Example 6 provides the method of example 4 or 5, in which the updating occurs automatically and periodically throughout operation of the vehicle.

Example 7 provides the method of any one of examples 4-6, in which the updating is performed using artificial intelligence.

Example 8 provides the method of any one of examples 4-7, in which the updating is performed manually by an operator of the site.

Example 9 provides the method of any one of examples 1-8, in which the site includes a first site and the geographic boundary includes a first geographic boundary, the method further including automatically detecting that the vehicle is no longer operating within the first site and is operating within a second site defined by a second geographic boundary; and providing to the vehicle operational characteristics associated with the second site; in which the onboard controller causes the vehicle to operate in accordance with the operational characteristics of the second site while the vehicle remains within the second site.

Example 10 provides the method of any one of examples 1-9, in which the operational characteristics include at least one of a maximum vehicle speed, a maximum vehicle speed, vehicle battery charge characteristics, vehicle battery discharge characteristics, inertial measurement unit characteristics, data privacy requirements, a motor controller software version, and smart regeneration characteristics.

Example 11 provides an electric vehicle (EV) for operation within a site defined by a geographic boundary, the EV including a motor controller for controlling application of rotational torque to wheels of the EV; an onboard controller for controlling operation of the motor controller, the onboard controller further configured to receive operational characteristics from a fleet management system, in which the operational characteristics are associated with the site; in which the onboard controller causes the EV to operate in accordance with the operational characteristics while the EV remains within the site.

Example 12 provides the EV of example 11, in which the EV includes a golf cart and the site includes a golf course.

Example 13 provides the EV of example 11 or 12, in which the onboard controller is further configured to receive additional operational characteristics from a fleet management system, in which the additional operational characteristics are associated with at least one of an identity of the EV and a type of the EV; in which the onboard controller further causes the EV to operate in accordance with the additional operational characteristics while the EV remains within the site.

Example 14 provides the EV of any one of examples 11-13, in which the site includes a first site and the geographic boundary includes a first geographic boundary, and in which when the EV ceases operation within the first site and begins operation within a second site defined by a second geographic boundary, the onboard controller is further configured to receive from the fleet management system operational characteristics associated with the second site; in which the onboard controller causes the EV to cease operating in accordance with the operational characteristics associated with the first site and to operate in accordance with the operational characteristics associated with the second site while the EV remains within the second site.

Example 15 provides the EV of any one of examples 11-14, in which the operational characteristics include at least one of a maximum vehicle speed, a maximum vehicle speed, vehicle battery charge characteristics, vehicle battery discharge characteristics, inertial measurement unit characteristics, data privacy requirements, a motor controller software version, and smart regeneration characteristics.

Example 16 provides a fleet management system for managing a plurality of EVs including onboard computers for controlling operation of the EVs, the fleet management system configured to: automatically detecting operation of the EVs within a site defined by a geographic boundary; providing to the EVs operational characteristics associated with the site; in which the onboard controllers of the EVs cause the EVs to operate in accordance with the operational characteristics while the EVs remain within the site.

Example 17 provides the fleet management system of example 16, in which the fleet management system is further configured to, for at least one of the EVs: automatically at least one of an identity of the EV and a type of the EV; and provide to the at least one of the EVs operational characteristics associated with the at least one of the identity of the EV and the type of the EV.

Example 18 provides the fleet management system of example 16 or 17, in which the fleet management system is further configured to: determine updated the vehicle operational characteristics associated with the site; and provide the updated vehicle operational characteristics associated with the site to the EVs; in which subsequent to receipt of the updated vehicle operational characteristics associated with the site, the onboard controllers of the EVs cease causing the EVs to operate in accordance with the operational characteristics associated with the site and to cause the EVs to operate in accordance with the updated operational characteristics associated with the site while the vehicle remains within the site.

Example 19 provides the method of any one of examples 4-8, in which the determining the updated vehicle operational characteristics occurs automatically and periodically throughout operation of the EV.

Example 20 provides the fleet management system of any one of examples 16-18, in which the site includes a first site and the geographic boundary includes a first geographic boundary, and in which the fleet management system is further configure to: automatically detecting that at least one of the EVs is no longer operating within the first site and is operating within a second site defined by a second geographic boundary; and providing to the at least one of the EVs operational characteristics associated with the second site; in which the onboard controller of the at least one EV causes the at least one EV to operate in accordance with the operational characteristics of the second site while the at least one EV remains within the second site.

At least one embodiment is disclosed, and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, Rl, and an upper limit, Ru, is disclosed, any number falling within the range is specifically disclosed. In particular, the following numbers within the range are specifically disclosed: R=Rl+k*(Ru–

Rl), wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 95 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention. Also, the phrases "at least one of A, B, and C" and "A and/or B and/or C" should each be interpreted to include only A, only B, only C, or any combination of A, B, and C. The terms "substantially," "close," "approximately," "near," and "about," generally refer to being within +/−5-20% of a target value based on the context of a particular value as described herein or as known in the art. Similarly, terms indicating orientation of various elements, e.g., "coplanar," "perpendicular," "orthogonal," "parallel," or any other angle between the elements, generally refer to being within +/−5-20% of a target value based on the context of a particular value as described herein or as known in the art.

The diagrams in the FIGURES illustrate the architecture, functionality, and/or operation of possible implementations of various embodiments of the present disclosure. Although several embodiments have been illustrated and described in detail, numerous other changes, substitutions, variations, alterations, and/or modifications are possible without departing from the spirit and scope of the present disclosure, as defined by the appended claims. The particular embodiments described herein are illustrative only and may be modified and practiced in different but equivalent manners, as would be apparent to those of ordinary skill in the art having the benefit of the teachings herein. Those of ordinary skill in the art would appreciate that the present disclosure may be readily used as a basis for designing or modifying other embodiments for carrying out the same purposes and/or achieving the same advantages of the embodiments introduced herein. For example, certain embodiments may be implemented using more, less, and/or other components than those described herein. Moreover, in certain embodiments, some components may be implemented separately, consolidated into one or more integrated components, and/or omitted. Similarly, methods associated with certain embodiments may be implemented using more, less, and/or other steps than those described herein, and their steps may be performed in any suitable order.

Numerous other changes, substitutions, variations, alterations, and modifications may be ascertained to one of ordinary skill in the art and it is intended that the present disclosure encompass all such changes, substitutions, variations, alterations, and modifications as falling within the scope of the appended claims.

One or more advantages mentioned herein do not in any way suggest that any one of the embodiments described herein necessarily provides all the described advantages or that all the embodiments of the present disclosure necessarily provide any one of the described advantages. Note that in this specification, references to various features included in "one embodiment", "example embodiment", "an embodiment", "another embodiment", "certain embodiments", "some embodiments", "various embodiments", "other embodiments", "alternative embodiment", and the like are intended to mean that any such features are included in one or more embodiments of the present disclosure but may or may not necessarily be combined in the same embodiments.

As used herein, unless expressly stated to the contrary, use of the phrase "at least one of," "one or more of" and "and/or" are open ended expressions that are both conjunctive and disjunctive in operation for any combination of named elements, conditions, or activities. For example, each of the expressions "at least one of X, Y and Z", "at least one of X, Y or Z", "one or more of X, Y and Z", "one or more of X, Y or Z" and "A, B and/or C" can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z. Additionally, unless expressly stated to the contrary, the terms "first," "second," "third," etc., are intended to distinguish the particular nouns (e.g., blade, rotor, element, device, condition, module, activity, operation, etc.) they modify. Unless expressly stated to the contrary, the use of these terms is not intended to indicate any type of order, rank, importance, temporal sequence, or hierarchy of the modified noun. For example, "first X" and "second X" are intended to designate two X elements that are not necessarily limited by any order, rank, importance, temporal sequence, or hierarchy of the two elements. As referred to herein, "at least one of," "one or more of," and the like can be represented using the "(s)" nomenclature (e.g., one or more element(s)).

In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph (f) of 35 U.S.C. Section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method of operating an open cabin vehicle (OCV), wherein the OCV comprises an onboard controller, the method comprising:

automatically detecting by a fleet management system operation of the OCV LUV within a site defined by a geographic boundary, wherein the fleet management system is located remotely from the OCV and wherein the site has a governing body associated therewith for establishing regulations regarding operation of the OCV within the site;

accessing from a database associated with the fleet management system operational characteristics associated with the site, wherein the operational characteristics comprise the regulations established by the governing body; and wirelessly communicating by the fleet management system to the onboard controller the operational characteristics associated with the site;

wherein the onboard controller controls operation of the OCV by a driver in accordance with the operational characteristics communicated by the fleet management system while the OCV remains within the site; and wherein the operational characteristics comprise a combination of two or more of vehicle battery charge characteristics, vehicle battery discharge characteristics, data privacy requirements, a motor controller software version, and smart regeneration characteristics.

2. The method of claim 1, wherein the OCV comprises a golf cart and the site comprises at least one of a golf course and a residential neighborhood.

3. The method of claim 1, further comprising:

automatically determining by the fleet management system an identity of the OCV;

accessing from the database associated with the fleet management system second operational characteristics associated with the determined identity of the OCV; and wirelessly communicating by the fleet management system to the onboard controller data comprising the second operational characteristics.

4. The method of claim 1, further comprising:

updating the operational characteristics associated with the site; and wirelessly communicating the updated operational characteristics associated with the site to the OCV.

5. The method of claim 4, wherein subsequent to the updating, the onboard controller ceases controlling operation of the OCV by the driver in accordance with the operational characteristics while the OCV remains within the site and instead controls operation of the OCV by the driver in accordance with the updated operational characteristics while the OCV remains within the site.

6. The method of claim 4, wherein the updating occurs automatically and periodically throughout operation of the OCV.

7. The method of claim 4, wherein the updating is performed using artificial intelligence.

8. The method of claim 4, wherein the updating is performed manually by an operator of the site.

9. The method of claim 1, wherein the site comprises a first site, the governing body comprises a first governing body, and the geographic boundary comprises a first geographic boundary, the method further comprising:

automatically detecting by the fleet management system that the OCV is no longer operating within the first site and is operating within a second site defined by a second geographic boundary, wherein the second site has a second governing body associated therewith for establishing regulations regarding operation of the OCV within the second site;

accessing from the database associated with the fleet management system operational characteristics associated with the second site, wherein the operational characteristics associated with the second site comprise the regulations established by the governing body;

wirelessly communicating by the fleet management system to the onboard controller the operational characteristics associated with the second site; and wherein the onboard controller controls operation of the OCV by the driver in accordance with the operational characteristics of the second site communicated by the fleet management system while the OCV remains within the site.

10. A fleet management system for managing a plurality of remotely-located electric open cabin vehicles (EVs) each comprising a passenger seating area, a canopy over the passenger seating area, and an onboard computer for controlling operation of the EV, the fleet management system configured to:

automatically detect operation of the EVs within a site defined by a geographic boundary using geopositioning system (GPS) data, wherein the site has associated therewith a governing body for establishing regulations regarding operation of the EVs within the site;

access from a database operational characteristics associated with the site, wherein the operational characteristics comprise the regulations established by the governing body; and send to the onboard computers of the EVs data comprising the operational characteristics;

wherein the onboard controllers of the EVs operate the EVs accordance with the operational characteristics received from the fleet management system while the EVs remain within the site; and wherein the operational characteristics comprise maximum vehicle speed, vehicle battery charge characteristics, vehicle battery discharge characteristics, data privacy requirements, a motor controller software version, and smart regeneration characteristics.

11. An electric lightweight utility vehicle (EV) for operation within a site defined by a geographic boundary and having a governing body associated therewith for establishing regulations regarding operation of the EV within the site, the EV comprising:

a passenger seating area;

a canopy disposed over the passenger seating area;

a motor controller for controlling application of rotational torque applied to wheels of the EV; and an onboard controller for sending commands to the motor controller to control operation thereof, the onboard controller further configured to receive operational characteristics from a remotely-located fleet management system via a wireless communications network, wherein the operational characteristics comprise the regulations established by the governing body associated with the site and are stored in a database accessible by the fleet management system;

wherein the onboard controller operates the EV in accordance with the operational characteristics while the EV remains within the site; and wherein the operational characteristics comprise a combination of vehicle battery charge characteristics, vehicle battery discharge characteristics, data privacy requirements, a motor controller software version, and smart regeneration characteristics.

12. The EV of claim 11, wherein the EV comprises a golf cart and the site comprises at least one of a golf course and a residential neighborhood.

13. The EV of claim 11, wherein the onboard controller is further configured to receive additional operational characteristics from the fleet management system, wherein the additional operational characteristics are associated with an identity of the EV, and wherein the onboard controller further operates the EV in accordance with the additional operational characteristics while the EV remains within the site.

14. The EV of claim 11, wherein the site comprises a first site, the governing body comprises a first governing body, and the geographic boundary comprises a first geographic boundary, wherein when the EV ceases operation within the first site and begins operation within a second site defined by a second geographic boundary and having a second governing body associated therewith for establishing regulations regarding operation of the EV within the second site, the onboard controller is further configured to receive from the fleet management system operational characteristics associated with the second site, and wherein the onboard controller ceases operating the EV to in accordance with the operational characteristics associated with the first site and instead operates the EV to operate in accordance with the operational characteristics associated with the second site while the EV remains within the second site.

15. The fleet management system of claim 10, wherein the accessing and communicating the updated vehicle operational characteristics occurs automatically and periodically throughout operation of the EV.

16. The fleet management system of claim 10, wherein the site comprises a first site, the governing body comprises a first governing body, and the geographic boundary comprises a first geographic boundary, and wherein the fleet management system is further configured to:

automatically detect that at least one of the EVs is no longer operating within the first site and is operating within a second site defined by a second geographic boundary, wherein the second site has a second governing body associated therewith for establishing regulations regarding operation of the EV within the second site;

access from the database operational characteristics associated with the second site; and wirelessly communicate to the onboard computer of at least one of the EVs operational characteristics associated with the second site;

wherein the onboard controller of the at least one of the EVs operates the at least one EV in accordance with the operational characteristics of the second site while the at least one EV remains within the second site.

17. The fleet management system of claim 10, wherein the fleet management system is further configured to, for each of the EVs:

automatically detect an identity of the EV;

access from the database second operational characteristics associated with the detected identity of the EV; and wirelessly communicate to the onboard computer of the EV data comprising the second operational characteristics.

18. The fleet management system of claim 10, wherein subsequent to operational characteristics associated with the site being updated to comprise updated operational characteristics, the fleet management system is further configured to:

access the updated operational characteristics from the database; and wirelessly communicate to the onboard computers data comprising the updated operational characteristics associated with the site;

wherein subsequent to receipt of the updated operational characteristics associated with the site, the onboard controllers of the EVs cease operating the EVs in accordance with the operational characteristics associated with the site and instead operate the EVs in accordance with the updated operational characteristics associated with the site while the EV remains within the site.

* * * * *